(12) United States Patent
Woodell

(10) Patent No.: US 6,603,425 B1
(45) Date of Patent: Aug. 5, 2003

(54) METHOD AND SYSTEM FOR SUPPRESSING GROUND CLUTTER RETURNS ON AN AIRBORNE WEATHER RADAR

(75) Inventor: Daniel L. Woodell, Robins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/668,656

(22) Filed: Sep. 22, 2000

(51) Int. Cl.[7] ................................................ G01S 13/95
(52) U.S. Cl. ........................ 342/26; 342/74; 342/75; 342/159; 342/189; 342/195
(58) Field of Search ........................... 342/26, 74–80, 342/158–164, 175, 192–197, 189

(56) References Cited

U.S. PATENT DOCUMENTS 3,781,878 A * 12/1973 Kirkpatrick .................. 342/26
3,885,237 A * 5/1975 Kirkpatrick .................. 342/26
6,236,351 B1 * 5/2001 Conner et al. ............... 342/26

OTHER PUBLICATIONS

Co-pending patent application Docket No. 00CR093/KE entitled "Multi-Sweep Method And System For Detecting And Displaying Weather Information On A Radar System" filed on an even date, inventor D. Woodell;
Co-pending patent application Docket No. 00CR218/KE entitled "Multi-Sweep Method And System For Mapping Terrain With A Weather Radar System" filed on an even date, inventor D. Woodell;
Co-pending patent application Docket No. 00CR028/KE entitled "Method And System For Detecting Turbulence With Reduced Errors Resulting From Vertical Shear Components" filed on an even date, inventor D. Woodell et al.

* cited by examiner

Primary Examiner—Bernarr E. Gregory
(74) Attorney, Agent, or Firm—Nathan O. Jensen; Kyle Eppele

(57) ABSTRACT

A system and method for suppressing ground clutter in avionics weather radars which includes automatically making multiple scans, closely spaced in time and space, and comparing the returning signals to known ground return signals over known tilt angle variations.

11 Claims, 1 Drawing Sheet

METHOD AND SYSTEM FOR SUPPRESSING GROUND CLUTTER RETURNS ON AN AIRBORNE WEATHER RADAR

CROSS REFERENCE TO RELATED APPLICATIONS

This application relates to an application entitled "MULTI-SWEEP METHOD AND SYSTEM FOR DETECTING AND DISPLAYING WEATHER INFORMATION ON A WEATHER RADAR SYSTEM" by Daniel L. Woodell, Ser. No. 09/668,674, filed Sep. 22, 2000, and also relates to another application entitled "MULTI-SWEEP METHOD AND SYSTEM FOR MAPPING TERRAIN WITH A WEATHER RADAR SYSTEM" by Daniel L. Woodell, Ser. No. 09/667,442, filed Sep. 22, 2000, and further relates to an application entitled "METHOD AND SYSTEM FOR DETECTING TURBULENCE WITH REDUCED ERRORS RESULTING FROM VERTICAL SHEAR COMPONENTS", by Daniel L. Woodell, Roy Robertson, and Ying C. Lai, Ser. No. 09/668,715, filed Sep. 22, 2000, all assigned to a common assignee, which applications are incorporated herein in their entirety by this reference.

FIELD OF THE INVENTION

The present invention generally relates to avionics, and more particularly relates to weather radars, and even more particularly relates to methods and systems for suppressing ground clutter returns on avionics radars.

BACKGROUND OF THE INVENTION

Over the years, the tasks and results expected of a commercial airline pilot have increased. The cockpit of a typical modern commercial jetliner is much more elaborate with electronic navigation, communication, and control equipment, than that of an early commercial passenger aircraft. This equipment, in general, has proven to be quite beneficial. A prime example is the weather radar, which is extremely helpful in guiding an aircraft comfortably through storms, etc. However, the weather radar displays have been plagued with a persistent problem of displaying unwanted and confusing ground clutter returns.

To address these problems, typically, a pilot will adjust the tilt angle of the weather radar antenna and will look to see if the display is different at different angles. The pilot would then mentally assimilate this information and reach a conclusion as to the true ambient conditions about the aircraft.

Other automated approaches have been attempted to suppress ground clutter, such as use of statistical analysis of the radar returns to assess the amount of variations in the returns. If the radar return variation characteristics were determined to more likely be resulting from ground targets, they were edited from the radar display.

While these attempts at ground clutter suppression have been used extensively in the past, they do have some drawbacks.

First of all, the pilot intervention efforts often would be quite burdensome to the pilot during times of severe weather. The pilot is most likely already extremely concerned with the ambient conditions, and deciphering the weather radar and manipulating it are extra burdens the pilot would much prefer did not exist. Additionally, these pilot tilt angle adjustments and their resulting analysis were tasks in which pilot error could occur.

Secondly, the use of statistical variation information to edit radar displays had a high rate of misidentification.

Additionally, this approach was highly dependent upon the antenna beam to ground geometry.

Consequently, there exists a need for improved methods and systems for suppressing ground clutter for airborne weather radars in an efficient manner.

SUMMARY OF THE INVENTION

It is an object of the present invention to provide a system and method for suppressing ground clutter in an avionics weather radar in an efficient manner.

It is a feature of the present invention to utilize a plurality of geometrically and temporally closely spaced antenna scans.

It is another feature of the present invention to include a comparison of return profiles, including average radar power return levels as a function of beam geometry, with known or predicted profiles of average power of ground returns as a function of beam geometry.

It is an advantage of the present invention to achieve improved efficacy of ground clutter suppression systems and methods.

The present invention is an apparatus and method for improving the quality of ground clutter suppression in avionics weather radars, which is designed to satisfy the aforementioned needs, provide the previously stated objects, include the above-listed features, and achieve the already articulated advantages. The present invention is carried out in a "mis-identification-less" manner in a sense that the mis-identification of weather as ground clutter has been greatly reduced. The present invention is also carried out in a "pilot intervention-less" manner in the sense that pilot tilt angle adjustments and mental analysis of multiple returns to "filter out" ground clutter has been reduced.

Accordingly, the present invention is a system and method including multiple closely spaced, in time and space, weather radar scans and a computer comparison of average power level of radar returns in relation to known variations of average power levels of ground returns as a function of beam geometry and orientation.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
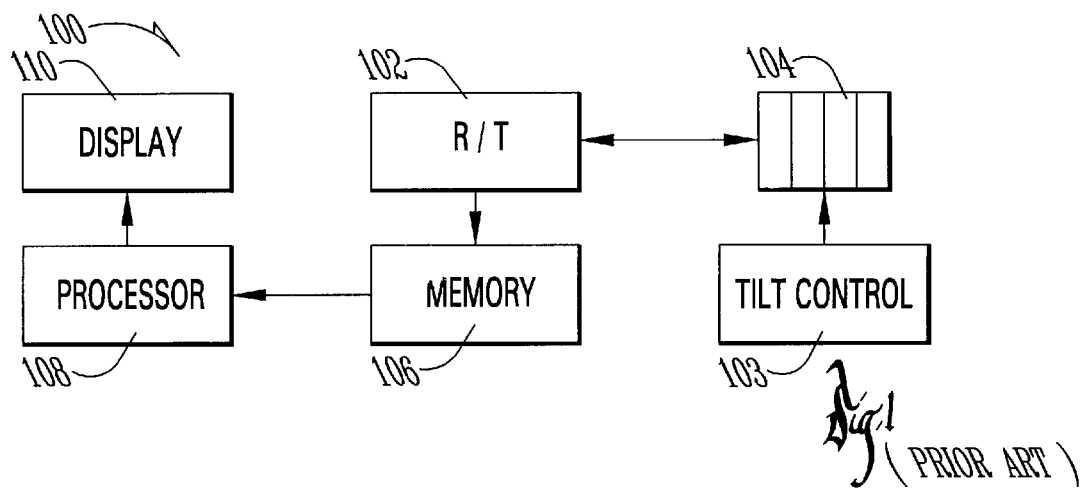
FIG. 1 is a simplified block diagram view of a weather radar system of the prior art.

Now referring to the drawings wherein like numerals refer to like matter throughout, and more specifically referring to FIG. 1, there is shown a system of the prior art, generally designated 100, including a weather radar receiver/transmitter 102 coupled to a weather radar adjustable antenna 104. A manual antenna tilt control system 103 is included for manually controlling the tilt angle of the antenna by the pilot. This system is generally used by a pilot to manually adjust the tilt angle. In some prior art systems, the displays have been improved with an additional single scan smoothing memory 106, which is used to store one scan and limit the display of radically different data on the next sweep which is done at the same tilt angle. Weather radar return processing unit 108 is used to suppress ground clutter and perform time-based smoothing operations, as well as other well-known functions of an avionics weather radar system 100. The degree of integration of the components 102, 103, 104, 106, 108, and 110 is a matter of designer's choice, and numerous prior art systems have many variations to those described above.

Figure 2:
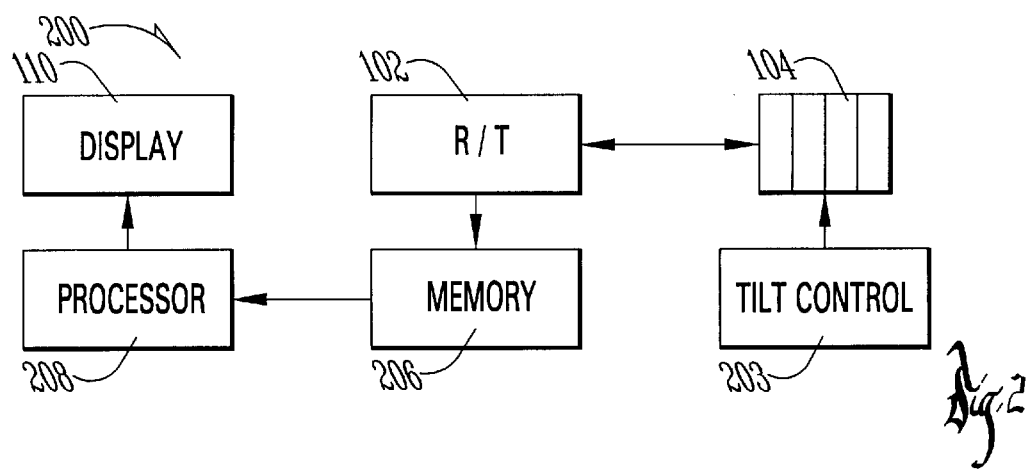
FIG. 2 is a simplified view of a block diagram view of a weather radar system of the present invention.

A detailed understanding of the present invention can be achieved by now referring to FIG. 2, which shows the avionics weather radar system of the present invention, generally designated 200, having a weather radar receiver/transmitter 102, a weather radar adjustable antenna 104 and a multi-scan, multi-tilt angle, memory 206. Also included is a tilt control 203 for automatically controlling the tilt angle of the antenna 104; this auto control may include an additional manual control feature as well. This automatic tilt control 203 adjusts between antenna sweeps, the tilt angle of the antenna 104 by small, predetermined angles. This multi-scan, multi-tilt angle, memory 206 is believed to be new to the industry. Preferably, this memory is capable of storing in a readily addressable and rapidly retrievable manner, at least two, but preferably more, data sets resulting from two or more antenna sweeps at slightly different angles.

The data in multi-scan, multi-tilt angle, memory 206 is used to achieve the beneficial properties of the present invention. The multi-scan, multi-tilt angle, weather radar return processing unit 208 will perform the customary functions performed by weather radar return processing unit 108, plus it will perform several additional operations based upon the additional data available in multi-scan, multi-tilt angle, memory 206. In general, multi-scan, multi-tilt angle, weather radar return processing unit 208 will analyze the average power and the drop-off of power of at least two sets of returns at slightly different tilt angles. The average power level is a preferred statistic to use; however, it should be understood that any other statistic relating to the power level of the return could be used. It is believed that the ideal change in tilt angle for this purpose is about one-half of a beam width when the beam is directed at the radar horizon, and more than one-half, but less than one beam width when the radar is directed substantially below the radar horizon. This measured drop-off of power is compared to predetermined average power drop-off profiles for given tilt angles and ranges for known ground clutter returns. If the measured drop-off profile matches an appropriate predetermined stored drop-off profile, then a determination is made that the return is ground clutter, and it can be removed from the data to be displayed to the pilot. An alternate approach is to use antenna tilt angle, and add antenna boresight offset which would be indicated by the derivative of amplitude versus beam angle.

Prefatory to making the average power measurements and comparisons, the multi-scan, multi-tilt angle, weather radar return processing unit 208 will need to rotate and translate stored images to assure proper alignment during the analyzing process. This rotation and translation can be done with the aid of an on-board inertial reference system, such as a gyro, airspeed indicator, altimeters, GPS, accelerometers, etc. The analyzing process can be tailored for each type of system being designed. However, in general, the average power drop-off analysis would typically be implemented by a software program or hardware configuration which effectively utilizes known techniques for determining average power and average power drop-off. These average power detection techniques are well known and believed to provide a superior result in comparison with prior art ground clutter suppression techniques which relate to the much less robust, short-term standard deviation of radar returns or the short-term autocorrelation of radar returns.

In operation, the apparatus and method of the present invention as described in FIGS. 1 and 2, could function as follows:

1. A first radar sweep is made at a first tilt angle. The tilt angle can be one that is manually selected by the pilot or one that is automatically selected by the radar or other systems on the aircraft.

2. A first set of returns from the first radar sweep is stored in the multi-scan, multi-tilt angle, memory 206.

3. Without prompting or pilot intervention, the radar system makes a slight adjustment in the tilt angle of the antenna, and a second tilt angle is thereby established.

4. A second radar sweep is made at the second tilt angle.

5. A second set of radar returns from the second radar sweep is stored in multi-scan, multi-tilt angle, memory 206.

6. Multi-scan, multi-tilt angle, weather radar return processing unit 208 is used to align the returns from the $1^{st}$ and $2^{nd}$ beams, so as to account for aircraft movement occurring during the time interval between sweeps.

7. Average return power is calculated for each segment of each set of return that is being subjected to the ground clutter suppression technique of the present invention.

8. The difference of average power between the returns is determined, and a profile of changes in average power levels is created.

9. A comparison of the measured profile is made with a predetermined profile for predetermined ground clutter returns.

10. If the measured profile is a match within predetermined comparison limits, the relevant portions of the sets of data are excluded from data which is displayed to the pilot as weather.

It should be noted that numerous predetermined profiles can be made under controlled conditions for numerous different tilt angles and beam shapes, ranges, etc. Depending on the level of discrimination desired, these predetermined profiles may be made with numerous other variables, such as seasonal, and geo referenced as well; i.e., there may be a different profile for the great plains of Canada during the summer than during the winter. Similarly, there may be a different profile provided for Eastern Colorado than Western Colorado. Any other variable may be used and predetermined if it results in a significant difference in the nature of ground returns.

The above method describes the use of a single additional sweep beyond the normal sweep. It may be desirable to do several additional sweeps. One could be at a tilt angle slightly above the original tilt angle, and the other could be slightly below the original tilt angle.

Throughout this description, reference is made to on-board avionics weather radar and to pilots because it is believed that the beneficial aspects of the present invention would be most readily apparent when used by pilots in connection with on-board avionics weather radar; however, it should be understood that the present invention is not intended to be so limited and should be hereby construed to include other non-avionics and terrestrially-based weather radars, as well as radars used by persons other than pilots.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A method of suppressing ground clutter on a weather radar display comprising the steps of:

scanning a first area using an antenna disposed at a first tilt angle;

receiving first radar returns as a result of said step of scanning a first area, said first returns having therein a first ground clutter component and a first weather component;

providing a computer antenna controller coupled to said antenna and automatically adjusting an orientation of said antenna to a second tilt angle;

scanning a second area using said antenna disposed at said second tilt angle;

receiving second radar returns as a result of said step of scanning a second area, said second returns having therein a second ground clutter component and a second weather component;

making a first comparison which is a comparison of a first return power statistic of said first radar returns and a second return power statistic of said second radar returns to determine differences resulting from an angular difference between said first tilt angle and said second tilt angle; and generating a received return angular statistical power profile;

making a second comparison which is a comparison of said received return angular statistical power profile with a predetermined return angular power profile for ground returns over a predetermined tilt angle range; and making a determination in response to said second comparison as to a portion of a radar return which represents a ground clutter component and which can be deleted from a display to a pilot.

2. A method of claim 1 wherein said step of making a first comparison includes a step of making a relative adjustment between said first radar return and said second radar returns which results in a translation of a scanned data set.

3. A method of claim 2 wherein said step of making a first comparison includes a step of making a relative adjustment between said first radar return and said second radar returns which results in a rotation of a scanned data set.

4. A method of claim 3 wherein said step of receiving first radar returns includes a sampling of a first predetermined frequency range which is known to result in relatively low variations in radar return power levels.

5. A method of claim 4 further wherein said computer antenna controller makes a second adjustment to a tilt angle and establishes a third tilt angle;

a third area is scanned and a third comparison of statistical power level change is made and a determination regarding displaying weather information to a pilot is made in response to said third comparison.

6. A method of claim 5 wherein said second comparison uses a plurality of predetermined return power profiles which have a plurality of differing characteristics.

7. A method of claim 6 wherein said plurality of differing characteristics include geographic references.

8. A method of claim 7 wherein said plurality of differing characteristics include tilt angle references.

9. A method of claim 8 wherein said first return power statistic is an average power level.

10. A method of claim 3 wherein said step of receiving first radar returns includes a filtering at each antenna sweep to reduce variation in radar return estimates.

11. A method of claim 1 wherein said first return power statistic is an average power level.

* * * * *